US008826935B2

(12) United States Patent
Nakada et al.

(10) Patent No.: US 8,826,935 B2
(45) Date of Patent: Sep. 9, 2014

(54) GAS FLOW MONITORING SYSTEM

(75) Inventors: Akiko Nakada, Kasugai (JP); Yoji Mori, Komaki (JP); Naoya Shiroyama, Kasugai (JP); Minoru Ito, Kasugai (JP)

(73) Assignee: CKD Corporation, Komaki-shi (JP)

( * ) Notice: Subject to any disclaimer, the term of this patent is extended or adjusted under 35 U.S.C. 154(b) by 169 days.

(21) Appl. No.: 13/602,719

(22) Filed: Sep. 4, 2012

(65) Prior Publication Data

US 2013/0092269 A1 Apr. 18, 2013

(30) Foreign Application Priority Data

Oct. 12, 2011 (JP) ................. 2011-225180

(51) Int. Cl.
*F16K 31/02* (2006.01)
*G05D 7/06* (2006.01)
*G01F 1/00* (2006.01)

(52) U.S. Cl.
CPC ............... *G05D 7/0635* (2013.01); *G01F 1/00* (2013.01)
USPC .......... 137/487.5; 137/486; 73/1.34; 73/1.35; 702/113

(58) Field of Classification Search
USPC ............... 137/487.5, 486, 607, 597; 73/1.34, 73/1.35; 702/113
See application file for complete search history.

(56) References Cited

U.S. PATENT DOCUMENTS

| | | | | |
|---|---|---|---|---|
| 4,671,097 A * | 6/1987 | Kurki et al. | ..................... | 73/1.34 |
| 5,233,861 A * | 8/1993 | Gore et al. | ..................... | 73/1.16 |
| 5,394,755 A * | 3/1995 | Sudo et al. | ...................... | 73/861 |
| 6,363,958 B1 * | 4/2002 | Ollivier | .............................. | 137/2 |
| 6,439,253 B1 * | 8/2002 | Easton | .............................. | 137/9 |
| 7,174,263 B2 * | 2/2007 | Shajii et al. | .................... | 702/100 |
| 7,412,986 B2 * | 8/2008 | Tison et al. | ..................... | 137/12 |
| 7,463,991 B2 * | 12/2008 | Shajii et al. | .................... | 702/100 |
| 7,835,874 B2 * | 11/2010 | Wong et al. | ...................... | 702/50 |
| 7,881,886 B1 * | 2/2011 | Shareef et al. | .................. | 702/47 |
| 7,975,558 B2 * | 7/2011 | Lee et al. | .................. | 73/861.08 |
| 7,979,165 B2 * | 7/2011 | Gotoh et al. | .................. | 700/282 |

(Continued)

FOREIGN PATENT DOCUMENTS

JP A-09-184600 7/1997
TW 200600990 A 1/2006

OTHER PUBLICATIONS

Taiwanese Patent Office, Office Action issued May 28, 2014 in Taiwanese Patent Application No. 101133244.

*Primary Examiner* — Stephen M Hepperle
*Assistant Examiner* — Minh Le
(74) *Attorney, Agent, or Firm* — Oliff PLC

(57) ABSTRACT

A gas flow monitoring system is provided in process gas lines each arranged to supply gas to a predetermined process chamber via a flow control device, the system being configured to measure lowering or rising of gas pressure before and after the flow control device to monitor a flow rate of the flow control device. The system includes a first flow monitoring unit placed upstream of the flow control device in a selected one of the process gas lines, a second flow monitoring unit placed in a discharge passage upstream of the process chamber, and a controller that constantly monitors the flow rate of the flow control device with the first flow monitoring unit and, when the first flow monitoring unit detects the flow-rate abnormality two or more times, commands the second flow monitoring unit to re-verify whether flow-rate abnormality is present or not in the flow control device.

12 Claims, 8 Drawing Sheets

(56) References Cited

U.S. PATENT DOCUMENTS

| | | | |
|---|---|---|---|
| 8,074,677 B2* | 12/2011 | Gold et al. | 137/487.5 |
| 8,205,629 B2* | 6/2012 | Gregor et al. | 137/2 |
| 8,443,649 B2* | 5/2013 | Yasuda et al. | 73/1.34 |
| 2002/0092564 A1* | 7/2002 | Ollivier | 137/487.5 |
| 2004/0094206 A1* | 5/2004 | Ishida | 137/487.5 |
| 2004/0261492 A1* | 12/2004 | Zarkar et al. | 73/1.34 |
| 2005/0182524 A1 | 8/2005 | Brodeur et al. | |
| 2006/0052904 A1 | 3/2006 | Brodeur et al. | |
| 2008/0223455 A1* | 9/2008 | Fukuhara et al. | 137/488 |
| 2009/0019943 A1* | 1/2009 | Ozawa et al. | 73/861 |
| 2009/0183549 A1* | 7/2009 | Monkowski et al. | 73/1.35 |
| 2010/0145633 A1* | 6/2010 | Yasuda | 702/45 |
| 2010/0229967 A1* | 9/2010 | Yasuda et al. | 137/486 |
| 2013/0186486 A1* | 7/2013 | Ding | 137/487 |

\* cited by examiner

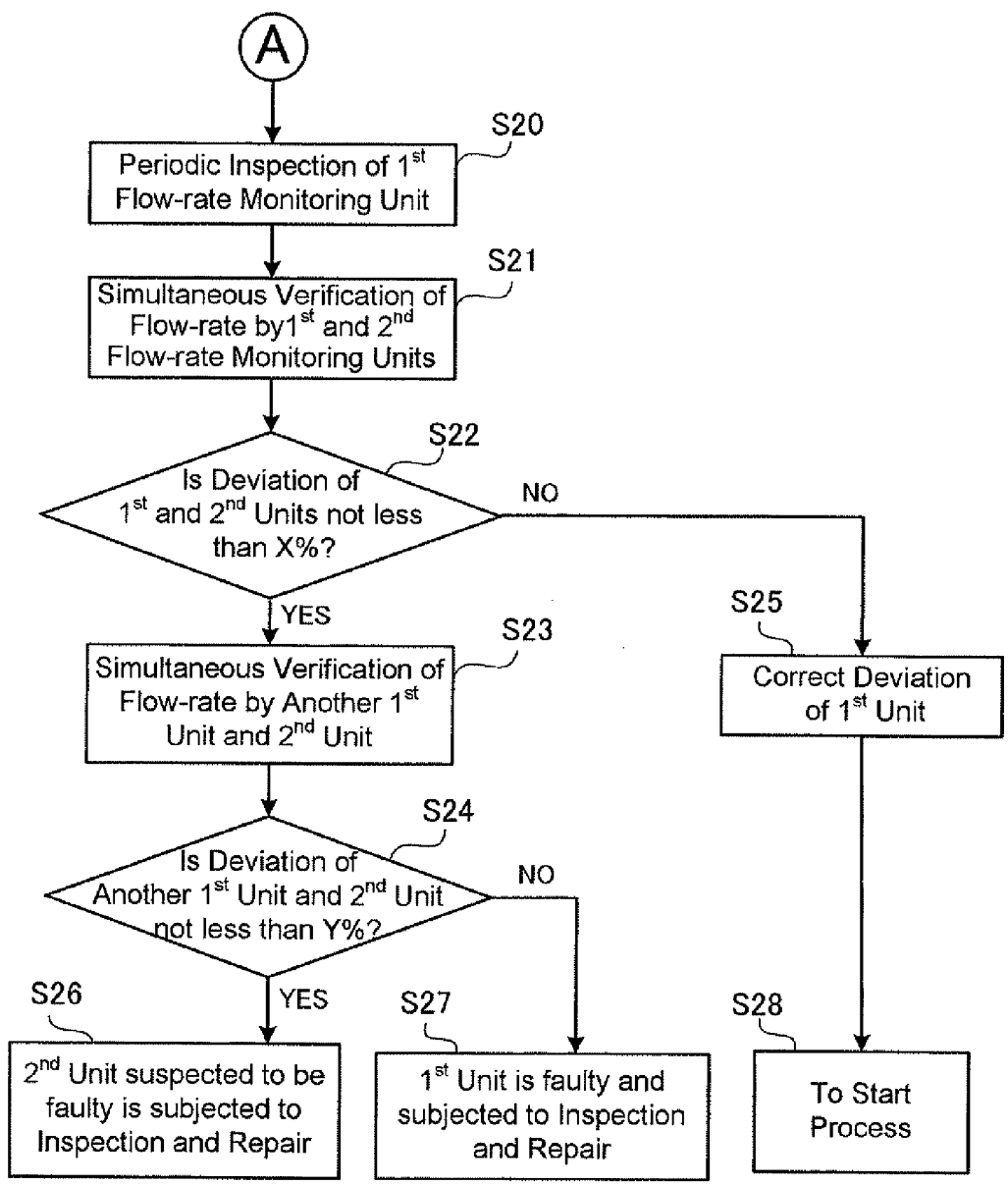

US 8,826,935 B2

GAS FLOW MONITORING SYSTEM

CROSS-REFERENCE TO RELATED APPLICATIONS

This application is based upon and claims the benefit of priority from the prior Japanese Patent Application No. 2011-225180, filed Oct. 12, 2011, the entire contents of which are incorporated herein by reference.

BACKGROUND OF THE INVENTION

1. Field of the Invention

The present invention relates to a gas flow monitoring system for monitoring flow rate accuracy of a flow control device (a mass flow controller and others) used in a gas supply system for a process gas or the like in a semiconductor manufacturing device.

2. Related Art

In coating devices, dry etching devices, and others in a semiconductor manufacturing process, for example, a special gas such as silane, a corrosive gas such as chlorine gas, a flammable gas such as hydrogen gas and phosphine are used. Their gas flow rates have a direct influence on the quality of products to be manufactured and thus have to be strictly controlled. In particular, in association with recent laminating and miniaturizing of semiconductor substrates, improved reliability in a process gas supply system are demanded more than before.

Therefore, for example, Patent Document 1 discloses a flow control technique for supplying gas in a semiconductor manufacturing process.

In this technique in Patent Document 1, a pressure gauge and a final cutoff valve are provided downstream of a mass flow controller (MFC) to accurately calculate a gas flow rate to be discharged to a process chamber. After the final cutoff valve is closed, a pressure rise measured by the pressure gauge is sampled at predetermined time intervals and then a pressure inclination angle is calculated in a high correlation coefficient range from the sampled date to calculate a flow rate of the MFC. Patent Document 1 also discloses that a cutoff valve and a pressure gauge are provided upstream of the MFC. In this case, after the cutoff valve is closed, a pressure drop measured by the pressure gauge is sampled at predetermined time intervals and then a pressure inclination angle is calculated in a high correlation coefficient range from the sampled date.

RELATED ART DOCUMENTS

Patent Documents

Patent Document 1:JP 9(1997)-A-184600

SUMMARY OF INVENTION

Problems to be Solved by the Invention

However, the technique disclosed in Patent Document 1 has the following problems. In Patent Document 1, the pressure drop or pressure rise detected by the pressure gauge is measured after the cutoff valve upstream or downstream of the MFC is closed. During flow-rate verification, the gas flow to be discharged to the process chamber is inevitably stopped.

In Patent Document 1, however, every time flow-rate verification is performed, the gas flow to be discharged to the process chamber is stopped. This causes a problem that an operating rate of the gas supply system in the semiconductor manufacturing device lowers.

Of the process gasses, in particular, a coating material gas may be deposited as solid matters in a gas line due to its characteristic. In case solid matters are deposited in a fine pipe portion in the MFC, the flow rate of gas to be discharged from the MFC to the process chamber gradually changes. As this gas flow rate changes, a yield rate of semiconductor wafers lowers. Therefore a system capable of constantly monitoring the changes in gas flow rate is required.

The technique in Patent Document 1 is predicated on that the gas flow to be discharged to the process chamber is stopped during flow-rate verification. This causes a problem that the changes in gas flow rate cannot be constantly monitored in the system during operation.

Furthermore, the pressure gauge placed upstream of the MFC has to measure the pressure of gas supplied from a process gas source. The gas pressure from the process gas source is generally as high as about 0.5 MPa. Accordingly, a high-precision pressure sensor is unusable therein. It is therefore difficult to determine whether a deviation amount occurring during flow-rate verification is an error of the pressure sensor or a deviation amount of the MFC itself.

However, the technique in Patent Document 1 enables the flow-rate verification of the MFC but cannot diagnose a flow-rate verification unit itself. Thus, the flow-rate verification cannot be executed with high reliability.

The present invention has been made to solve the above problems and has a purpose to provide a gas flow monitoring system for verifying a flow rate with high reliability including re-verification or self-diagnosis of a flow monitoring unit itself as needed, while constantly monitoring flow rate accuracy of a flow control device (a mass flow controller and others).

Means of Solving the Problems (1) To achieve the above purpose, one aspect of the invention provides a gas flow monitoring system to be provided in a plurality of process gas lines each being arranged to supply gas from a process gas supply source to a predetermined process chamber via a flow control device, the system being configured to measure lowering or rising of gas pressure before and after the flow control device to monitor a flow rate of the flow control device, the system including: a first flow monitoring unit placed in a passage located upstream of the flow control device; a second flow monitoring unit placed in a discharge passage branching from a passage located upstream of the process chamber; and a controller that constantly monitors a flow rate of the flow control device with the first flow monitoring unit and that, when the first flow monitoring unit detects the flow-rate abnormality two or more times, commands the second flow monitoring unit to re-verify whether the flow-rate abnormality is present or not in the flow control device.

(2) Another aspect of the invention provides a gas flow monitoring system to be provided in a plurality of process gas lines each being arranged to supply gas from a process gas supply source to a predetermined process chamber via a flow control device, the system being configured to measure lowering or rising of gas pressure before and after the flow control device to monitor a flow rate of the flow control device, the system including: a first flow monitoring unit placed in a passage located upstream of the flow control device in an arbitrarily selected process gas line of the process gas lines; a second flow monitoring unit placed in a discharge passage branching from a passage located upstream of the process chamber; and a controller that constantly monitors a flow rate of the flow control device with the first flow monitoring unit and that, when the first flow monitoring unit verifies the flow rate by a predetermined number of times, commands the first and second flow monitoring units to simultaneously verify the flow rate and commands the first flow monitoring unit to correct, based on a flow-rate verification result of the second flow monitoring unit, a verification deviation amount defined by a difference between a flow rate calculated in the flow-rate verification performed by using the first flow monitoring unit and a flow rate set in the flow control device.

Effects of the Invention

Operations and advantageous effects of the gas flow monitoring system according to the present invention will be explained below.

(1) With the above configuration (1), the flow rate accuracy of the flow control device is constantly monitored and, when any abnormality in flow rate is found during constant monitoring, high-accurate re-verification is conducted. Thus, the reliability of the whole system can be enhanced.

To be concrete, the first flow monitoring unit is provided in an arbitrarily selected one of the process gas lines and thus can constantly monitor the flow rate of the important selected process gas line. Therefore, for example, because of the first flow monitoring unit provided in the gas line using a coating material gas that is apt to deposit solid matters in a fine pipe portion of the flow control device, the flow-rate accuracy of the process gas line in which flow-rate abnormality likely occurs is constantly monitored to promptly find the abnormality. This can effectively achieve enhancement of a yield rate of semiconductor wafers.

The second flow monitoring unit is provided in the discharge passage branching from the passage located upstream of the process chamber, so that the gas pressure discharged from the flow control device can be measured with high precision. This is because the gas pressure discharged from the flow control device is lower than the high gas pressure supplied from the process gas supply source and thus the suction pump is normally provided in the discharge passage, so that the gas pressure decreases to a low pressure near vacuum in the second flow monitoring unit and hence the high-accurate diaphragm type vacuum pressure gauge can be used in the second flow monitoring unit.

Furthermore, the system includes the controller that constantly monitors the flow rate of the flow control device with the first flow monitoring unit and, when the first flow monitoring unit detects the abnormal flow rate two or more times, commands the second flow monitoring unit to re-verify the presence/absence of any abnormal flow rate in the flow control device. It is therefore possible to constantly monitor the flow-rate accuracy of the flow control device and, when flow-rate abnormality is detected two or more times during constant monitoring, to perform higher accurate re-verification to determine the flow-rate abnormality is an error of the first flow monitoring unit or results from abnormality of the flow control device itself.

Accordingly, the flow-rate accuracy of the first flow monitoring unit is complemented by the second flow monitoring unit. Thus, the whole system can perform the flow monitoring with high reliability. The number of flow-rate verifications to be conducted by the second flow monitoring unit needing to stop the gas supply system can be reduced to a minimum. This also contributes to enhancement of the operation rate of the gas supply system in the semiconductor manufacturing device.

According to the configuration (1), therefore, the gas flow monitoring system can be provided capable of constantly monitoring the flow-rate accuracy of the flow control device (a mass flow controller and others) and making high-reliable flow-rate verification including re-verification or self-diagnosis of the flow monitoring unit itself as needed.

(2) With the above configuration (2), it is possible to constantly monitor the flow-rate accuracy of the flow control device and, when the flow-rate verification is conducted by the predetermined number of time, to perform the self-diagnosis of the flow monitoring unit itself to enhance reliability of the whole system.

To be concrete, the first flow monitoring unit is provided in the arbitrarily selected one of the process gas lines so that the important process gas line is selected to constantly monitor the flow rate thereof. Therefore, for example, when the first flow monitoring unit is provided in the gas line using a coating material gas that is apt to deposit solid matters in a fine pipe portion of the flow control device, the flow-rate accuracy of the process gas line that is likely to cause flow-rate abnormality can be constantly monitored. This makes it possible to effectively achieve enhancement of a yield rate of semiconductor wafers.

The second flow monitoring unit is provided in the discharge passage branching from the passage located upstream of the process chamber. Thus, the gas pressure discharged from the flow control device can be measured with high precision. This is because the gas pressure discharged from the flow control device is lower than the high gas pressure supplied from the process gas supply source and the suction pump is normally provided in the discharge passage, so that the gas pressure decreases to a low pressure near vacuum in the second flow monitoring unit and hence a high-accurate diaphragm type pressure gauge can be used.

Furthermore, the system includes the controller that constantly monitors a flow rate of the flow control device with the first flow monitoring unit, and commands the first and second flow monitoring units to simultaneously verify the flow rate when the first flow monitoring unit verifies the flow rate by a predetermined number of times and commands the first flow monitoring unit to correct a verification deviation amount of the first flow monitoring unit based on a flow-rate verification result of the second flow monitoring unit. Accordingly, the flow-rate accuracy of the flow control device can be constantly monitored and a verification value obtained by the first flow monitoring unit under constant monitoring is corrected based on the verification result of the second flow monitoring unit, so that the whole system can monitor the flow rate more reliably. Further, the number of flow-rate verifications to be conducted by the second flow monitoring unit can be minimized, thereby contributing to enhancement of the operation rate of the gas supply system in the semiconductor manufacturing device.

According to the configuration (2), consequently, the gas flow monitoring system can be provided capable of constantly monitoring the flow-rate accuracy of the flow control device (a mass flow controller and others) and making high-reliable flow-rate verification including re-verification or self-diagnosis of the flow monitoring unit itself as needed.

BRIEF DESCRIPTION OF THE DRAWINGS

FIG. 8 is a second control flow diagram in the gas flow monitoring system in the embodiment.

DESCRIPTION OF EMBODIMENTS

A detailed description of a preferred embodiment of a gas flow monitoring system embodying the present invention will now be given referring to the accompanying drawings. In this embodiment, a whole structure of the system is first explained as well as a first flow monitoring unit and a second flow monitoring unit, followed by explanations of their control flows and operations and effects.

<Whole Structure of Gas Flow Monitoring System>

Figure 1:
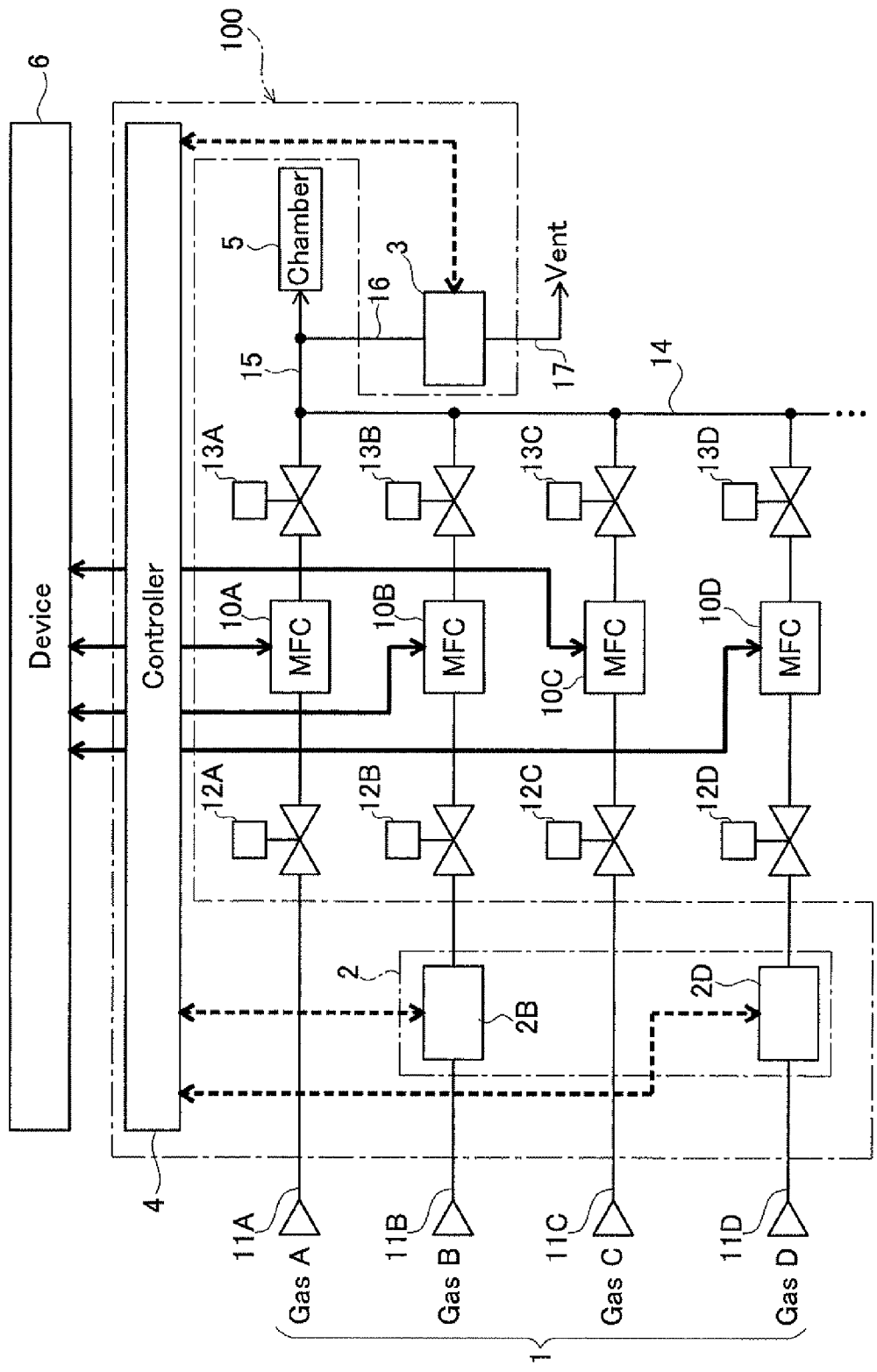
FIG. 1 is a diagram of an entire gas circuit providing a gas flow monitoring system in an embodiment of the present invention.

The whole structure of the gas flow monitoring system in the present embodiment is explained first. FIG. 1 is an overall diagram of a gas circuit providing the gas flow monitoring system in the present embodiment.

As shown in FIG. 1, a gas flow monitoring system 100 includes a first flow monitoring unit 2, a second flow monitoring unit 3, and a controller 4. This system 100 is placed in process gas lines 1.

The process gas lines 1 include a plurality of gas lines 11A to 11D configured to supply gasses A-D from respective process gas sources to a predetermined process chamber 5 via first line cutoff valves 12A-12D, flow control devices 10A-10D, and second line cutoff valves 13A-13D. The process gasses A-D used herein are for example a special gas such as silane, a corrosive gas such as chlorine gas, a flammable gas such as hydrogen gas and phosphine. The gas pressure of each process gas to be supplied is on the order of 0.4 MPa to 0.5 MPa.

As shown in FIG. 1, in process gas lines 11B and 11D selected from the process gas lines 1, first flow monitoring units 2B and 2D are placed upstream of the first line cutoff valves 12B and 12D respectively. The reason why the process gas line(s) 1 (11A-11D) to be provided with the first flow monitoring unit 2 is arbitrarily selected is because important ones of the process gas lines 1 is chosen to constantly monitor a flow rate of the chosen process gas line or lines. For instance, in a gas line using a coating material gas that is apt to cause deposition of solid matters in a fine pipe portion of the flow control device, the first flow monitoring unit 2 is placed to constantly monitor changes in flow rate, so that abnormality in flow rate can be verified quickly and reliably.

The first flow monitoring unit 2 measures pressure drop of the gas pressure in an upstream-side passage located upstream of the flow control device 10 (10B or 10D) targeted for verification to monitor the flow rate of the target flow control device 10.

The first line cutoff valves 12A-12D and the second line cutoff valves 13A-13D are air-operated valves for supplying or stopping process gas flowing in the flow control devices 10A-10D. The flow control devices 10A-10D are for example mass flow controllers (MFC) each including a mass flowmeter and a control valve which are operated in combination for feedback control to perform flow rate control. Accordingly, the gas can be stably discharged at a gas flow rate set at a predetermined value.

Downstream-side passages 14 located downstream of the second line cutoff valves 13A-13 join into a merging passage 15 upstream of the process chamber 5. In a discharge passage branching from the merging passage 15, the second flow monitoring unit 3 is placed. Specifically, the discharge passage consists of a first discharge passage 16 placed upstream of the monitoring unit 3 and the second discharge passage 17 placed downstream of the monitoring unit 3. During gas flow-rate verification, gas is supplied to the monitoring unit 3 through the first discharge passage 16 and is discharged to an outlet port (Vent) through the second discharge passage 17. The second flow monitoring unit 3 can precisely measure the pressure of the gas supplied therein from the flow control devices 10A-10D via the first discharge passage 16. The reasons thereof are as below. The gas pressure discharged from each of the flow control devices 10A-10D is lower than high gas pressure from the process gas source and thus a suction pump 18 (see FIG. 5) is normally provided in the second discharge passage 17. Accordingly, in the second flow monitoring unit 3, a low pressure close to a vacuum state is created, so that a high-accurate diaphragm pressure gauge is usable.

In the gas flow monitoring system 100, as shown in FIG. 1, there are provided the first flow monitoring unit 2, the second flow monitoring unit 3, and the controller 4 electrically connected to the flow control devices 10 (10A-10D). The controller 4 is a control part in the flow monitoring unit 100 to cause the first flow monitoring unit 2 to constantly monitor a flow rate of the flow control device 10 (e.g., the target flow control device 10B). The controller 4 also commands the second flow monitoring unit 3 to re-verify the presence/absence of abnormality in flow rate of the target flow control device 10 when the first flow monitoring unit 2 detects flow-rate abnormality two or more times. Further, the controller 4 causes the first flow monitoring unit 2 to constantly monitor the flow rate of the target flow control device 10 and also causes the first flow monitoring unit 2 and the second flow monitoring unit 3 to simultaneously verify the flow rate when the first flow monitoring unit 2 performs the flow-rate verification by predetermined times. Thus, the controller 4 instructs the first flow monitoring unit 2 to correct a verified deviation of the monitoring unit 2 based on a flow-rate verification result obtained by the second flow monitoring unit 3. For example, when the second flow monitoring unit 3 determines that abnormality is present in flow rate of the flow control device 10 and a deviation amount of the flow control device 10 is correctable, a set value of the flow control device 10 can be corrected in response to a command from the controller 4. The control method of the controller 4 will be explained in detail later referring to a control flow.

The controller 4 is electrically connected to a semiconductor manufacturing device 6. Accordingly, the device 6 can take measures, for example, automatic stop of operation in response to an electric signal from the controller 4 representing that the second flow monitoring unit 3 determines that the flow rate of the flow control device 10 is abnormal. In this case, the controller 4 can support for both serial communication and analog communication.

<First Flow Monitoring Unit>

Figure 2A:
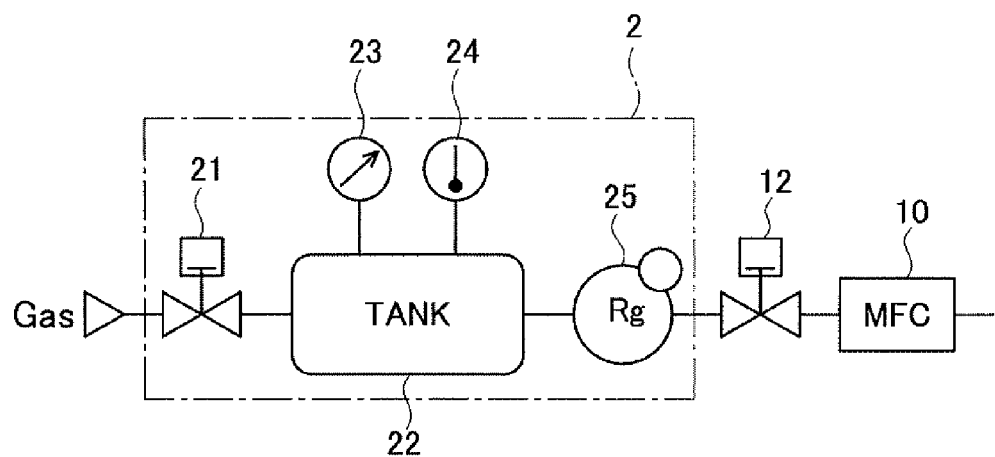
FIG. 2A is a gas circuit diagram of a first flow monitoring unit in the embodiment.
Figure 2B:
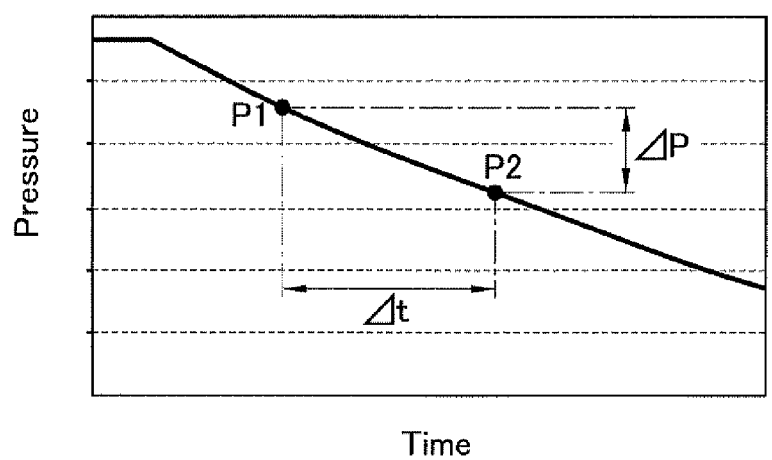
FIG. 2B is a graph showing pressure in gas flow-rate verification.
Figure 3:
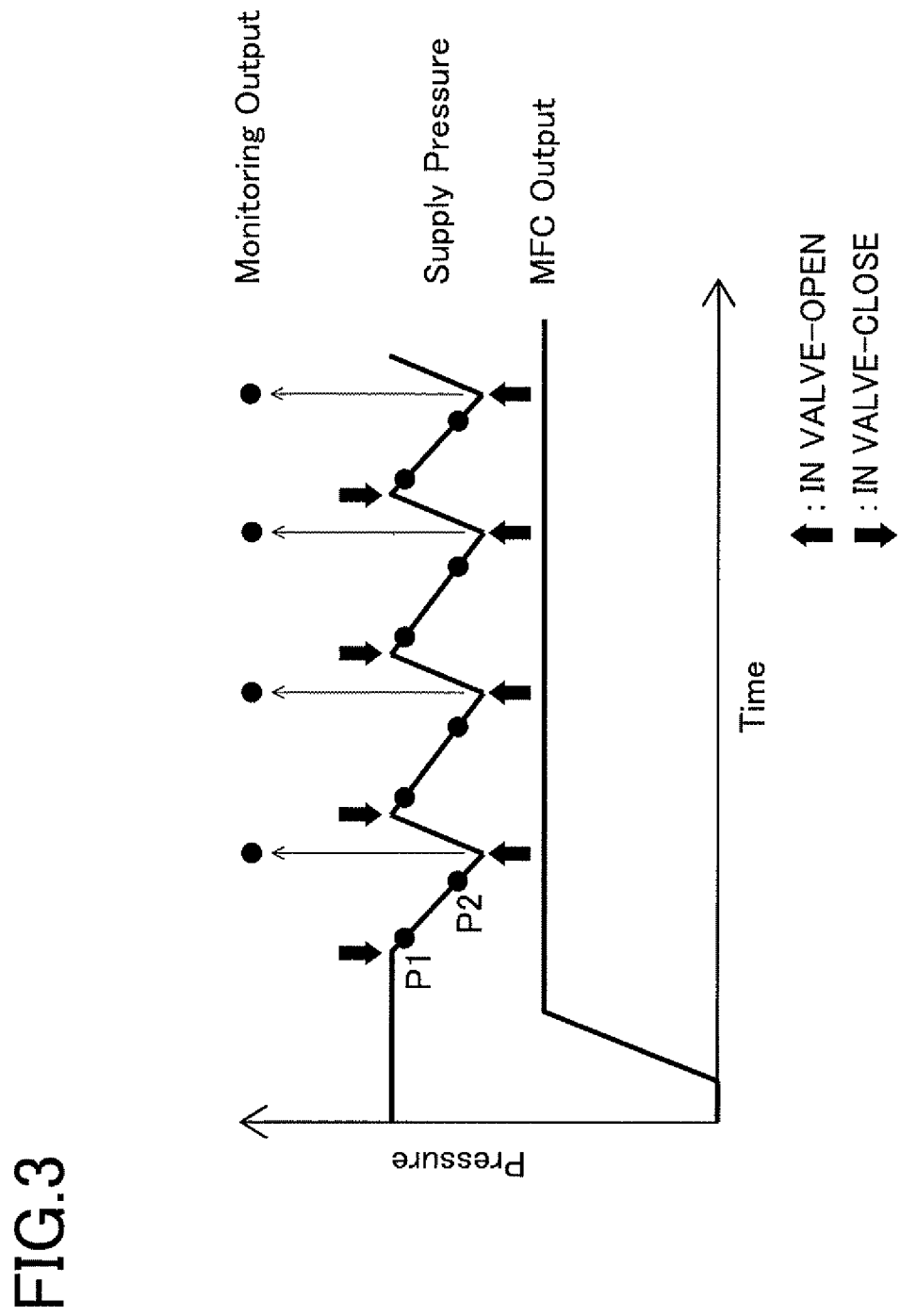
FIG. 3 is a pressure diagram when flow-rate accuracy of a flow control device (MFC) is constantly monitored by use of a first flow monitoring unit in the embodiment.
Figure 4:
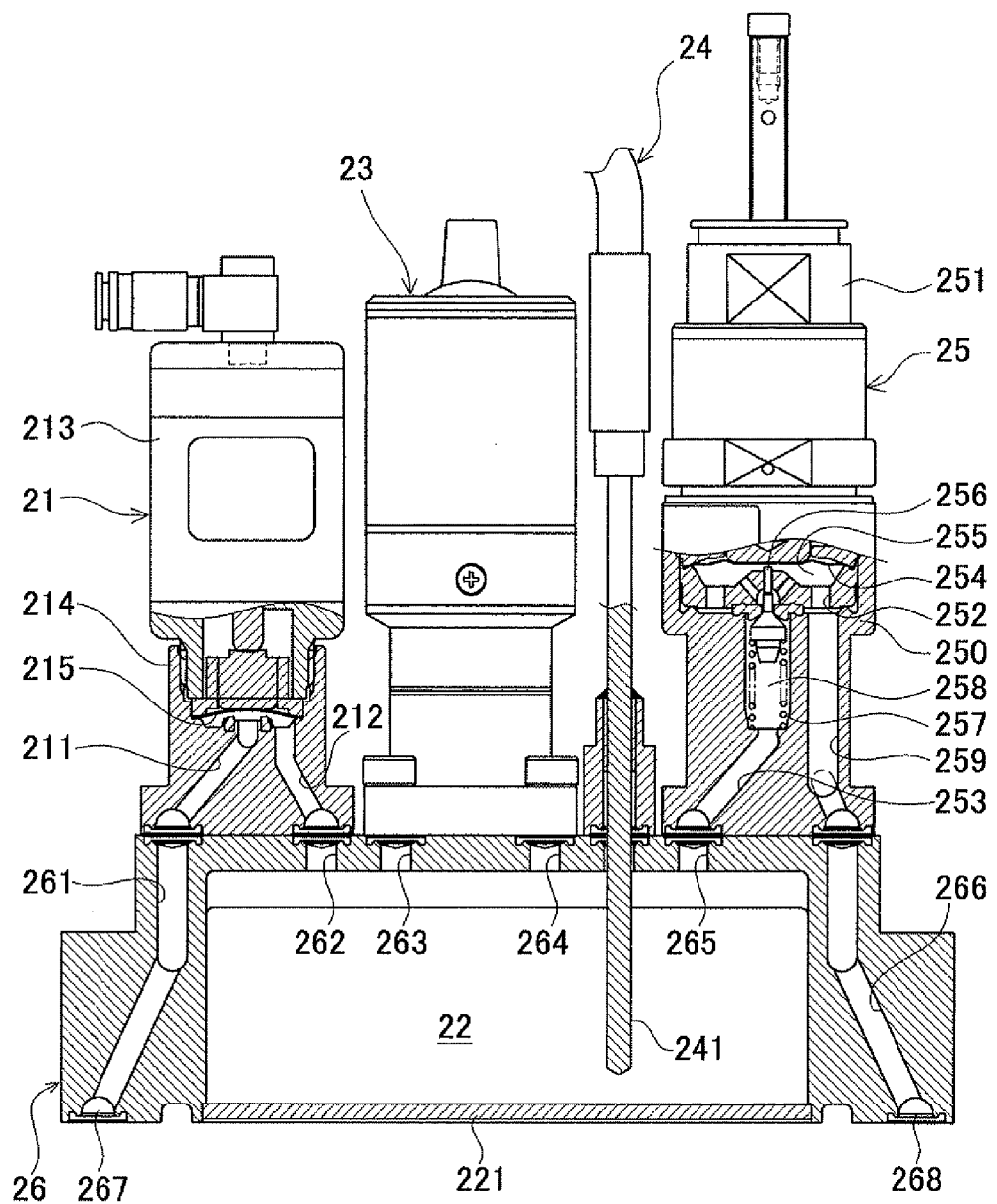
FIG. 4 is a cross sectional view of components constituting the first flow monitoring unit in the embodiment.

A circuit configuration of The first flow monitoring unit 2 will be explained below. FIG. 2A is a gas circuit diagram providing the first flow monitoring unit 2 in the present embodiment. FIG. 2B is a pressure diagram during gas flow-rate verification. FIG. 3 is a pressure diagram when flow-rate accuracy of the flow control device (MFC) is constantly monitored by use of the first flow monitoring unit 2 of the present embodiment. FIG. 4 is a cross sectional view of components constituting the first flow monitoring unit 2 in the present embodiment.

As shown in FIG. 2A, the first flow monitoring unit 2 is placed in a passage located upstream of the first line cutoff valve 12 in the process gas line 1. The first flow monitoring unit 2 includes a first start cutoff valve 21, a first measurement tank 22, a first pressure gauge 23, a first thermometer 24, and a regulator 25, which are placed in this order from the side close to the gas supply source.

The first start cutoff valve 21 is an air-operated valve that supplies or stops gas from the gas supply source to a downstream side. The first measurement tank 22 is a container that stores a fixed quantity of gas. The volume of this tank 22 can be selected optimally according to the flow rate of the flow control device 10, for example, can be set on the order of 50 cc to 60 cc. During gas flow-rate verification, the gas stored in the tank 22 flows out and the gas pressure lowers. The first pressure gauge 23 measures the pressure drop of the gas stored in the tank 22. Specifically, the first pressure gauge 23 is, for example, a strain-gauge-type pressure gauge in preparation for measurement of a high-pressure gas. The first thermometer 24 measures the temperature of the gas stored in the tank 22. The regulator 25 is a control valve to maintain the pressure of gas to be supplied to the flow control device 10 constant. For example, a set pressure of the regulator 25 is about 0.2 MPa.

Next, a flow monitoring method using the first flow monitoring unit is explained. Firstly, one-time flow-rate verifying method is explained.

As shown in FIG. 2B, when the first start cutoff valve 21 is closed, stopping gas supply from the gas supply source, the gas stored in the tank 22 flows out and the gas pressure in the tank 22 decreases. At the stage where a pressure drop rate per unit time of gas pressure becomes almost constant (a measurement start point P1), the first pressure gauge 23 measures the gas pressure. Then, after a lapse of a fixed time (a measurement end point P2), the first pressure gauge 23 measures the gas pressure again. At that time, a pressure drop amount $\Delta P$ which is a difference between the gas pressure at the measurement start point P1 and the gas pressure at the measurement end point P2 is calculated. A period of time $\Delta t$ from the measurement start point P1 to the measurement end point P2 is also calculated. A value of $\Delta P/\Delta t$ is proportional to the gas flow rate. Thus, this value is multiplied by a proportionality coefficient to calculate a gas flow rate to be supplied to the process chamber 5 from the flow control device 10. The calculated gas flow rate and the gas flow rate set in the flow control device 10 are compared. If a difference (a verification deviation amount) between those gas flow rates falls within a range corresponding to a predetermined reference value, the flow rate is determined to be normal. On the other hand, if this difference is out of the predetermined reference range, the flow rate is determined to be abnormal.

A method of constantly monitoring the flow-rate accuracy of the flow control device 10 by use of the first flow monitoring unit 2 will be explained below.

During operation of the semiconductor manufacturing device 6, when the first start cutoff valve 21 is sequentially opened and closed at predetermined time intervals in response to commands from the controller 4, the gas supply pressure repeatedly rises and lowers as shown in FIG. 3. The first flow monitoring unit 2 verifies a flow rate based on the amount and the time of pressure drop every time the supply pressure decreases. A verification result is transmitted as a monitoring output from the controller 4 to the semiconductor manufacturing device 6.

The time intervals at which the gas supply pressure repeats rising and lowering can be arbitrarily set, e.g., at in the order of several seconds to several tens of seconds. A pressure lower limit of the gas supply pressure that repeats rising and lowering is equal to or more than a set pressure of the regulator 25 which is an upstream-side pressure of the flow control device 10. This is because if inlet-side pressure of the regulator 25 is equal to or more than the set pressure of the regulator 25, gas can be supplied at a constant flow rate to the flow control device 10 without causing changes in outlet-side pressure of the regulator 25. As a result, an outlet-side flow rate of the flow control device 10 can also be maintained constant.

Accordingly, the flow-rate accuracy of the flow control device 10 can be constantly monitored by use of the first flow monitoring unit 2 while maintaining a gas supply system of the semiconductor manufacturing device 6.

Next, components of the first flow monitoring unit 2 will be explained.

As shown in FIG. 4, the first start cutoff valve 21, first pressure gauge 23, first thermometer 24, regulator 25 are mounted in this order from left in the figure on an upper surface of a first manifold 26. This manifold 26 has an almost rectangular box-like shape internally formed with a first measurement tank 22 having a rectangular cross section. In an upper wall of the manifold 26 (the tank 22), there are formed a passage 262 communicating with a secondary flow passage 212 of the first start cutoff valve 21, passages 263 and 264 communicating with the first pressure gauge 23, and a passage 265 communicating with a primary flow passage 253 of the regulator 25, the passages 262-265 being spaced from each other and vertically extending through the upper wall of the first manifold 26 to open in an inner surface of the upper wall. A sensor part 241 of the first thermometer 24 placed between the first pressure gauge 23 and the regulator 25 protrudes downward from the inner surface of the upper wall of the tank 22. At a lower end of the manifold 26, a plate-like cover member 221 is fixed to close the tank 22. In a left end portion of the manifold 26 in FIG. 4, a passage 261 is formed to connect an inlet port 267 provided to open in the lower end to a primary flow passage 211 of the cutoff valve 21. In a right end portion of the manifold 26 in FIG. 4, a passage 266 is formed to connect an outlet port 268 provided to open in the lower end to a secondary flow passage 259 of the regulator 25.

The first start cutoff valve 21 includes a driving part 213 and a body part 214. The driving part 213 moves a diaphragm 215 up and down by air operation to thereby supply and stop a gas flow.

The first pressure gauge 23 directly measures the gas pressure in the tank 22 through the passages 263 and 264 communicating with a sensor part not shown.

The first thermometer 24 measures the gas temperature in the tank 22. With the sensor part 241 protruding downward in the tank 22 by passing through the upper wall of the tank 22, the gas temperature in the tank 22 can be measured accurately. By measuring the gas temperature, gas temperature changes during gas flow-rate verification can be checked and reflected in calculation of a flow rate.

The regulator 25 includes an adjustment mechanism part 251 and a body part 250. A set pressure of the regulator 25 is adjusted by an adjustment mechanism not shown of the adjustment mechanism part 251. The adjustment mechanism adjusts an urging force of an adjustment spring not shown to move the diaphragm 254 up and down. The diaphragm 254 is placed to cover an upper end of a pressure control chamber 255. In this pressure control chamber 255, a protruding portion of a poppet valve element 256 protrudes from below to come into and out of contact with the diaphragm 254. The poppet valve element 256 is accommodated in a valve chamber 258 communicating with a primary flow passage 253 and is urged upward by a compression spring 257. A return passage 252 is formed to open in a lower end of the pressure control chamber 255 and also communicate with a secondary flow passage 259. Accordingly, the secondary-side pressure of the regulator 25 is fed back to the pressure control chamber 255 via the return passage 252.

<Second Flow Monitoring Unit>

Figure 5A:
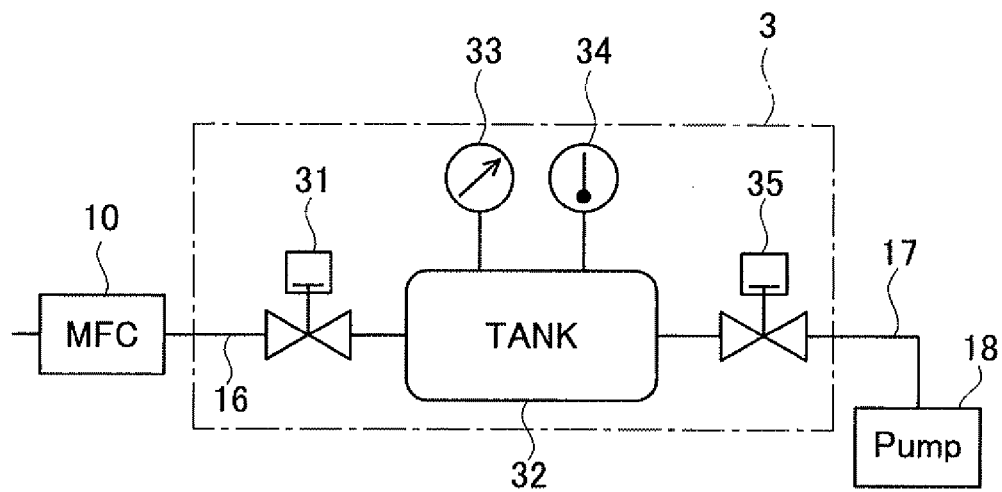
FIG. 5A is a gas circuit diagram providing a second flow monitoring unit in the embodiment.
Figure 5B:
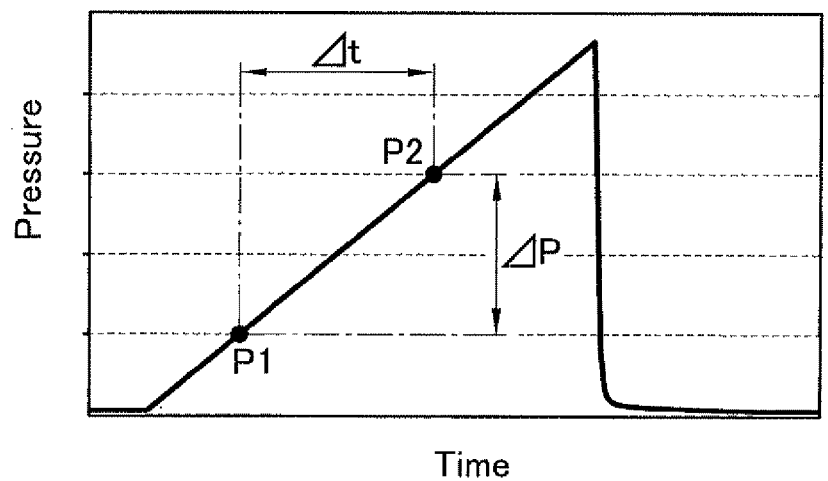
FIG. 5B is a pressure diagram in gas flow-rate verification.
Figure 6:
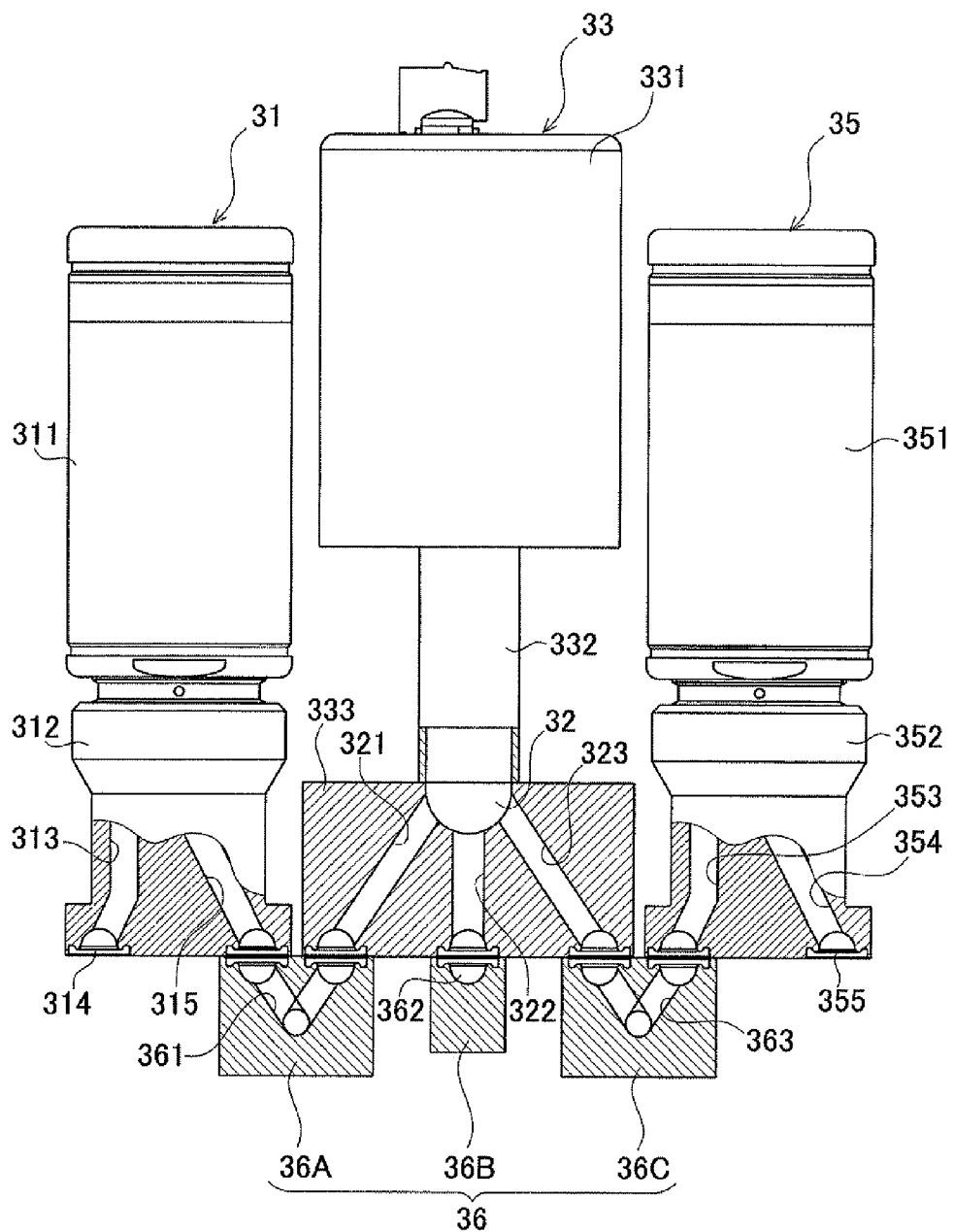
FIG. 6 is a cross sectional view of components constituting the second flow monitoring unit in the embodiment.

Next, a circuit configuration of the second flow monitoring unit 3 will be explained. FIG. 5A is a gas circuit diagram providing the second flow monitoring unit 3 in the present embodiment. FIG. 5B is a pressure diagram during a gas flow-rate verification. FIG. 6 is a cross sectional view components constituting the second flow monitoring unit 3 in the present embodiment.

As shown in FIG. 1, the second flow monitoring unit 3 is placed in the discharge passages 16 and 17 each branching from the merging passage 15 into which the passages 14 arranged downstream of the second line cutoff valve 13 (13A-13D) in the process gas line 1 merge. Furthermore, as shown in FIG. 5A, the second flow monitoring unit 3 includes a second start cutoff valve 31, a second measurement tank 32, a second pressure gauge 33, a second thermometer 34, and an operation cutoff valve 35, which are arranged in this order from the side close to the flow control device 10.

The second start cutoff valve 31 is an air-operated valve for supplying or stopping a gas flow from the flow control device 10 to the second measurement tank 32. This tank 32 is a container that stores a fixed quantity of gas. The volume of the tank 32 and the passage volume defined from a secondary side of the flow control device 10 to a primary side of the second start cutoff valve 31 are selected optimally according to the flow rate of the flow control device 10. For example, the volume of the tank 32 is of the order of 10 cc, the passage volume from the secondary side of the flow control device 10 to the primary side of the second start cutoff valve 31 is on the order of 80 cc to 120 cc. The second pressure gauge 33 measures the pressure rise of the gas stored in the tank 32. Specifically, the second pressure gauge 33 is, for example, a diaphragm type vacuum pressure gauge in preparation for gas measurement under vacuum. The second thermometer 34 measures the temperature of the gas stored in the tank 32. The operation cutoff valve 35 is an air-operated valve for supplying or stopping the gas flow from the tank 32 to the suction pump 17.

A flow-rate verification method of the second flow monitoring unit 3 will be explained below.

As shown in FIG. 5B, before gas flow-rate verification, the second line cutoff valves 13A-13D are closed and the second start cutoff valve 31 and the operation cutoff valve 35 are opened, and the gas stored in the second measurement tank 32 and others is sucked by the suction pump 18 to be discharged. The gas is thus discharged out of the second measurement tank 32 and others, so that the gas pressure in the tank 32 lowers into an almost vacuum state.

Thereafter, the second line cutoff valve 13 in the process gas line targeted for flow-rate verification is opened. At that time, the second line cutoff valve 13 in other process gas lines remain closed. After the gas flow rate becomes stable, the operation cutoff valve 35 is closed. Therefore, the gas supplied from the flow control device 10 in the process gas line targeted for flow-rate verification is stored in the second measurement tank 32 and others. In the tank 32 and others, the stored gas increases and the gas pressure rises accordingly.

At the stage where a pressure rising rate per unit time of gas pressure becomes almost constant (a measurement start point P1), the second pressure gauge 33 measures the gas pressure. Then, after a lapse of a fixed time (a measurement end point P2), the second pressure gauge 33 measures the gas pressure again. At that time, a pressure rising amount $\Delta P$ which is a difference between the gas pressure at the measurement start point P1 and the gas pressure at the measurement end point P2 is calculated. A period of time $\Delta t$ from the measurement start point P1 to the measurement end point P2 is also calculated. A value of $\Delta P/\Delta t$ is proportional to the gas flow rate. Thus, this value is multiplied by a proportionality coefficient to calculate a gas flow rate to be discharged from the flow control device 10.

The calculated gas flow rate and the gas flow rate set in the flow control device 10 are compared. If a difference (a verification deviation amount) between those gas flow rates falls within a range corresponding to a predetermined reference value, the flow rate is determined to be normal. On the other hand, if this difference is out of the predetermined reference range, the flow rate is determined to be abnormal. In this case, the second flow monitoring unit 3 uses a diaphragm type vacuum pressure gauge as the pressure gauge. Therefore, the second flow monitoring unit 3 can verify the flow rate with higher precision than the first flow monitoring unit 2 using a strain gauge type pressure gauge instead of the vacuum pressure gauge having a large diaphragm diameter and others.

The following explanation is given to components constituting the second flow monitoring unit 3.

As shown in FIG. 6, the second start cutoff valve 31, second pressure gauge 33, and operation cutoff valve 35 are mounted in this order from left in the figure on upper surfaces of a second manifold 36. The second manifold 36 consists of three rectangular blocks 36A-36C. In the right and left blocks 36A and 36C in the figure, respectively, V-shaped passages 361 and 363 are formed to open in respective upper surfaces of the blocks 36A and 36C. In the center block 36B, a semi-circular passage 362 is formed to open in an upper surface of the block 36B.

A base block 333 is placed in contact with a lower end of a cylindrical part 332 of the second pressure gauge 33. This base block 333 is of an almost rectangular block shape and internally formed with the second measurement tank 32. A vacuum chamber 331 of the second pressure gauge 33 and the tank 32 are communicated with each other. The tank 32 is formed with a curved cross section bulging downward. The base block 333 is internally formed with a left sloping passage 321 sloping to the lower left in FIG. 6, a right sloping passage 323 sloping to the lower right, a vertical passage 322 vertically extending between the passages 321 and 323, so that the passages 321-323 separately open in the curved surface of the tank 32 and communicate with a lower end of the base block 333.

The lower end (lower surface) of the base block 333 is in contact with the upper ends (upper surfaces) of the three rectangular blocks 36A-36C so that the left sloping passage 321 communicates with the left V-shaped passage 361 and the right sloping passage 323 communicates with the right V-shaped passage 363. The volume of each passage formed in the base block 333 and the rectangular blocks 36A-36C is included in the volume of a measurement tank during flow-rate verification. Accordingly, a passage diameter and passage length can be set to enhance the accuracy of flow-rate verification.

The second start cutoff valve 31 includes a driving part 311 and a body part 312. The driving part 312 is formed with a primary flow passage 313 and a secondary flow passage 315. The primary flow passage 313 is formed with an inlet port 314 communicating with a downstream side of the first discharge passage 16 so that gas is supplied to the inlet port 314. The secondary flow passage 315 communicates with the left V-shaped passage 361.

The operation cutoff valve 35 includes a driving part 351 and a body part 352. The body part 352 is formed with a primary flow passage 353 and a secondary flow passage 354. The primary flow passage 353 communicates with the right V-shaped passage 363. The secondary flow passage 354 is formed with an outlet port 355 communicating with an upstream side of the second discharge passage 17 to discharge gas into the passage 17.

The second thermometer 34 is attached to the second pressure gauge 33 to measure gas temperature in a vacuum chamber, not illustrated in FIG. 6, of the second pressure gauge 33. By accurately measuring the gas temperature in the second pressure gauge 33, gas temperature changes during gas flow-rate verification can be checked and reflected in calculation of a flow rate.

<Control Flow of Gas Flow Monitoring System>

Figure 7:
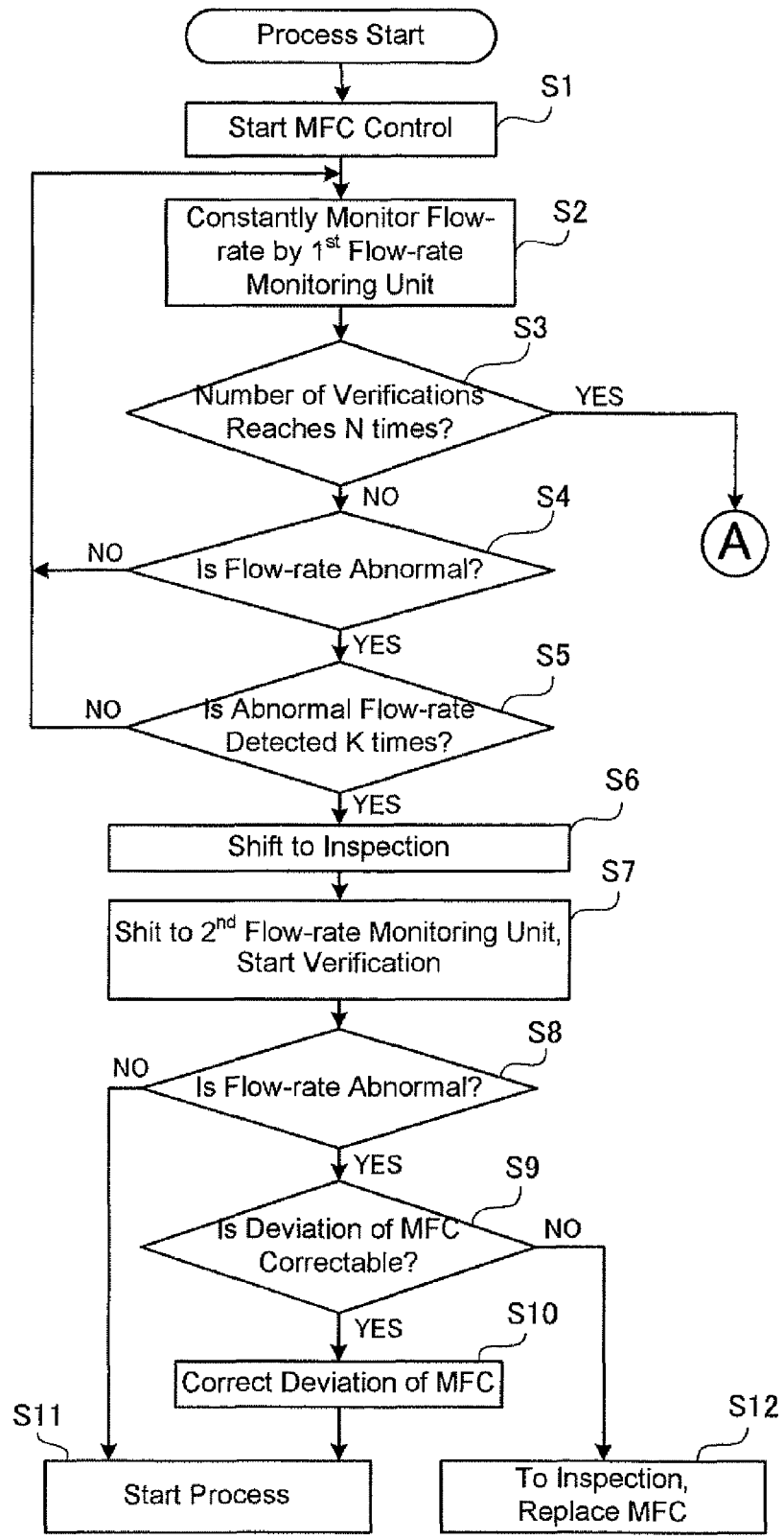
FIG. 7 is a first control flow diagram in the gas flow monitoring system in the embodiment.

Next, a control flow of the gas flow monitoring system 100 in the present embodiment will be explained. FIG. 7 is a first control flow diagram and FIG. 8 is a second control flow diagram in the present embodiment.

Firstly, a fundamental concept of the control flow to be executed in the gas flow monitoring system 100 in the present embodiment is explained. This control flow includes a first control flow (FIG. 7) and a second control flow (FIG. 8).

The first control flow shows the control to be executed during operation of the semiconductor manufacturing device 6 to reliably detect abnormality in flow rate of the flow control device 10 on the premise of constant monitoring and return the abnormal state of the device 10 to a normal state quickly. This control needs two types of flow monitoring units (the first flow monitoring unit 2 and the second flow monitoring unit 3). The first flow monitoring unit 2 and the second flow monitoring unit 3 are disposed respectively upstream and downstream of the flow control device 10 and selectively used by the controller 4. The first flow monitoring unit 2 constantly monitors whether or not the flow rate is abnormal on the upstream side of the flow control device 10 while a process gas is supplied.

However, the first flow monitoring unit 2 has low reliability of the flow-rate verification as mentioned above. Thus, when this unit 2 detects the abnormal flow rate two or more times, it is determined that there is a high possibility that the flow-rate abnormality has actually occurred. Then, the second flow monitoring unit 3 having higher reliability of the flow-rate verification is used to perform the flow-rate verification again. For this re-verification using the second flow monitoring unit 3, the operation of the semiconductor manufacturing device 6 is stopped. Therefore, the re-verification using the second flow monitoring unit 3 is limited to when the flow rate is likely to be abnormal.

As above, while the first flow monitoring unit 2 that constantly monitors the flow rate accuracy of the flow control device 10, when the abnormal flow rate is detected two or more times during the constant monitoring, the re-verification is then performed by the high-accurate second flow monitoring unit 3. This can perform highly reliable flow monitoring of the whole system.

The second control flow has the same steps as the steps (S1, S2) in the first control flow until the first flow monitoring unit 2 constantly monitors whether an abnormal flow rate is present while a process gas is supplied on the upstream side of the flow control device 10.

The first control flow is to return the abnormal flow rate of the flow control device 10 detected by the first flow monitoring unit 2 to a normal flow rate reliably and quickly by the second flow monitoring unit 3. In contrast, different from the first control flow, the second control flow is to periodically self-diagnose the first flow monitoring unit 2 by the high-accurate second flow monitoring unit 3. Specifically, this control has a self-diagnosis function to enhance the reliability of flow-rate verification of the first flow monitoring unit 2 by checking the first flow monitoring unit 2 having low reliability of flow-rate verification by use of the second flow monitoring unit 3 having high reliability of flow-rate verification, and correcting a deviation amount of the first flow monitoring unit 2.

As above, while the first flow monitoring unit 2 constantly monitors the flow-rate accuracy of the flow control device 10, the high-accurate second flow monitoring unit 3 corrects (self-diagnoses) the verification value of the first flow monitoring unit 2 that constantly monitors the flow rate. Thus, the whole system can perform flow monitoring with high reliability.

The details of the first control flow will be explained below. The control flow is explained referring to FIG. 7 and the gas circuit diagram is explained in detail referring to FIGS. 1, 2A, and 5A.

The flow-rate control of the flow control device 10 is started at S1. At S2, the first flow monitoring unit 2 starts constant monitoring of the flow rate of the flow control device 10. To be concrete, in response to a command from the controller 4, the first start cutoff valve 21 of the first flow monitoring unit 2 repeats opening and closing at predetermined time intervals and the first pressure gauge 23 measures an amount of pressure drop for constant flow-rate verification.

At S3, it is determined whether or not the number of verifications of the first flow monitoring unit 2 reaches N times. If a negative result is obtained, it is checked at S4 whether the flow rate is abnormal. Herein, the number of times "N" may be arbitrarily set based on past inspection records and others and for example to about 1000 times. When the number of verifications reaches N times, the process advances to the control for periodic inspection in the second control flow (A).

When the flow rate is determined to be abnormal at S4, the number of times of detection of abnormal flow rate is accumulated. When it is determined that this cumulative number reaches K times at S5, the flow advances to S6 where the flow control device 10 is inspected. Herein, a criteria for abnormal flow rate may be arbitrarily set, for example, to about ±5%. Further, the number of times "K" may be arbitrarily set and for example to about three times.

At S7, the second flow monitoring unit 3 starts to perform the flow-rate verification of the flow control device 10. To be concrete, the operation cutoff valve 35 of the second flow monitoring unit 3 is opened in response to a command from the controller 4 and the suction pump 18 creates a vacuum state of gas pressure in the second measurement tank 32. Thereafter, the operation cutoff valve 35 is closed and the second start cutoff valve 31 is opened. The pressure rising amount of gas pressure in the second measurement tank 32 is measured for flow-rate verification. Since the second flow monitoring unit 3 enables high-accurate flow-rate verification as mentioned above, when the flow rate is determined to be abnormal at S8, it is checked at S9 whether or not a deviation amount of the flow control device 10 can be corrected. Herein, a criteria for abnormal flow-rate may be arbitrarily set, for example, to about ±1%. If the deviation amount of the flow control device 10 is correctable, the deviation amount of the flow control device 10 is corrected at S10 and then a process (e.g., a semiconductor manufacturing process) is started at S11. When the deviation amount of the flow control device 10 is determined to be uncorrectable at S9, the flow advances to S12 where the flow control device 10 is replaced with another flow control device. After all, final determination of abnormal flow rate, correction of the deviation amount, and replacement of the flow control device 10 are based on verification results of the second flow monitoring unit 3 having high reliability of flow-rate verification.

In the first control flow, as above, the final determination of and the measures against the abnormal flow rate of the flow control device 10 are made based on the verification results of the highly reliable second flow monitoring unit 3. The whole system can therefore achieve highly reliable flow monitoring and also prevent an excessive decrease in operation rate.

The details of the second control flow will be explained below. This control flow is explained referring to FIG. 8 and a gas circuit diagram is explained in detail referring to FIGS. 1, 2A, and 5A.

When the number of verifications reaches N times at S3, the flow advances to the periodic inspection of the first flow monitoring unit 2 (e.g., 2B) at S20 in the second control flow. In this case, the operation of the semiconductor manufacturing device 6 is stopped. At S21, the flow-rate verification is performed by simultaneously using the first flow monitoring unit 2 and the second flow monitoring unit 3. Specifically, the pressure drop amount of the first pressure gauge 23 and the pressure rising amount of the second pressure gauge 33 are measured at the same time for flow-rate verification. When the deviation amounts of flow rates verified by both the flow monitoring units 2 and 3 are determined to be lower than X %, the deviation amount of the first flow monitoring unit 2 is corrected at S25 and then the process is started at S28. In this case, assuming that a flow rate calculated by the second flow monitoring unit 3 is positive, a zero point or a coefficient is corrected so that a flow rate to be calculated by the first flow monitoring unit 2 coincides with the value calculated by the second flow monitoring unit 3. In the first control flow, the first flow monitoring unit 2 monitors the flow rate based on the flow rate corrected in the flow-rate verification using the second flow monitoring unit 3. In the second control flow, a correction value is determined without correction based on the flow-rate verification using the second flow monitoring unit 3.

On the other hand, when the deviation amounts of flow rates verified by the flow monitoring units 2 and 3 are determined to be not less than X % at S22, the flow-rate verification is performed again by use of another first flow monitoring unit (e.g., 2D) and the second flow monitoring unit 3 at S23. When the deviation amounts of flow rates verified by the flow monitoring units 2 (2D) and 3 is also determined to be not less than Y % at 524, it is determined at S26 that the second flow monitoring unit 3 is suspected to be faulty. Thus, the second flow monitoring unit 3 is subjected to inspection and repair. When the deviation amounts of flow rates verified by the flow monitoring units 2 (2D) and 3 is determined to be less than Y % at S24, the previously-used first flow monitoring unit 2 (2B) is determined to be faulty at S27 and thus is subjected to inspection and repair. It is to be noted that criteria X % and Y % may be arbitrarily set, for example, to about ±1%.

In the second control flow, as above, the first flow monitoring unit 2 is periodically self-diagnosed by the second flow monitoring unit 3 having higher reliability, so that the whole system can achieve high-reliable flow monitoring and also prevent the operation rate from lowering excessively.

<Operations and Effects>

As explained in detail above, according to the gas flow monitoring system 100 in the present embodiment, it is possible to provide a gas flow monitoring system arranged to constantly monitor the flow-rate accuracy of the flow control device 10 and, as needed, perform highly reliable flow-rate verification including re-verification or self-diagnosis of the flow monitoring unit itself.

Specifically, in the present embodiment, the first flow monitoring unit 2 is provided in the arbitrarily selected process gas lines 11B and 11D of the plurality of process gas lines 1, so that the flow rate in an important process gas line is selectively constantly monitored. Therefore, since the first flow monitoring unit 2 is provided in a gas line using e.g. a coating material gas which is apt to deposit solid matters in a fine pipe portion of the flow control device 10, the flow-rate accuracy of the process gas line in which flow-rate abnormality is apt to occur is constantly monitored to promptly find abnormality of the process gas line. This can effectively achieve enhancement of the yield rate of semiconductor wafers.

The second flow monitoring unit 3 is provided in the discharge passages 16 and 17 branching from the merging passage 15 into which the passages 14 downstream of the second line cutoff valve 13 merge on the upstream side of the process chamber 5. Thus, the gas pressure discharged from the flow control device 10 can be measured with high precision. This is because the gas pressure discharged from the flow control device 10 is lower than the high gas pressure from the process gas supply source and the suction pump 18 is normally provided for the discharge passages 16 and 17, so that the gas pressure decreases to a low pressure near vacuum in the second flow monitoring unit 3 and hence the high-accurate diaphragm type vacuum pressure gauge can be used in the unit 3.

According to the present embodiment, furthermore, the controller 4 causes the first flow monitoring unit 2 to constantly monitor the flow rate of the flow control device 10 and, when the first flow monitoring unit 2 detects the abnormal flow rate two or more times, commands the second flow monitoring unit 3 to verify the presence/absence of abnormal flow rate in the flow control device 10 again. It is therefore possible to constantly monitor the flow-rate accuracy of the flow control device 10 and, when flow-rate abnormality is detected two or more times during constant monitoring, to perform higher accurate re-verification to determine the flow-rate abnormality is an error of the first flow monitoring unit 2 or results from abnormality of the flow control device 10 itself.

Accordingly, the flow-rate accuracy of the first flow monitoring unit 2 is complemented by the second flow monitoring unit 3. Thus, the whole system can perform the flow monitoring with high reliability. The number of flow-rate verifications to be conducted by the second flow monitoring unit 3 needing to stop the gas supply system can be reduced to a minimum. This also contributes to enhancement of the operation rate of the gas supply system in the semiconductor manufacturing device 6.

According to the present embodiment, the controller 4 controls the first flow monitoring unit 2 to constantly monitor the flow rate of the flow control device 10 and, when the first flow monitoring unit 2 performs the flow-rate verification by the predetermined number of times, controls both the first flow monitoring unit 2 and the second flow monitoring unit 3 to simultaneously perform the flow-rate verification, and to correct a deviation amount verified by the flow monitoring unit 2 based on the flow-rate verification result of the second flow monitoring unit 3. While the flow-rate accuracy of the flow control device 10 is constantly monitored by the first flow monitoring unit 2, the verification value of the first flow monitoring unit 2 is corrected (self-diagnosed) by the high-accurate second flow monitoring unit 3, so that the whole system can make highly reliable flow monitoring.

The present invention is not limited to the above embodiment. The present invention may be embodied in other specific forms without departing from the essential characteristics thereof.

In the above embodiment, in the first control flow, when the first flow monitoring unit 2 having low reliability of flow-rate verification detects the flow-rate abnormality two or more times, it is determined that the flow-rate abnormality is likely to actually have occurred. The flow-rate verification is then performed by the second flow monitoring unit 3 having high reliability of flow-rate verification to correct the deviation amount of the flow control device 10. At that time, the deviation amount (a value before correction) of the flow control device 10 may be stored in history records to monitor the tendency of the deviation amount of the flow control device 10.

INDUSTRIAL APPLICABILITY

The present invention can be utilized as a gas flow monitoring system for verifying a flow rate of a flow control device (a mass flow controller and others) to be used in a gas supply system for process gas or the like in a semiconductor manufacturing device.

REFERENCE SIGNS LIST 1, 11A-11D Process gas line
2, 2B, 2D First flow monitoring unit
3 Second flow monitoring unit
4 Controller
5 Process chamber
6 Semiconductor manufacturing device
10, 10A-10D Flow control device
12, 12A-12D First line cutoff valve
13, 13A-13D Second line cutoff valve
14 Downstream-side passage
15 Merging passage
16 First discharge passage
17 Second discharge passage
18 Suction pump
21 First start cutoff valve
22 First measurement tank
23 First pressure gauge
24 First thermometer
25 Regulator
26 First manifold
31 Second start cutoff valve
32 Second measurement tank
33 Second pressure gauge
34 Second thermometer
35 Operation cutoff valve
36 Second manifold
100 Gas flow monitoring system

The invention claimed is:

1. A gas flow monitoring system to be provided in a plurality of process gas lines each being arranged to supply gas from a process gas supply source to a predetermined process chamber via a flow control device, the system being configured to measure lowering or rising of gas pressure before and after the flow control device to monitor a flow rate of the flow control device, the system including:
   a first flow monitoring unit placed in a passage located upstream of the flow control device;
   a second flow monitoring unit placed in a discharge passage branching from a passage located upstream of the process chamber; and
   a controller that constantly monitors a flow rate of the flow control device with the first flow monitoring unit and that, when the first flow monitoring unit detects the flow-rate abnormality two or more times, commands the second flow monitoring unit to re-verify whether the flow-rate abnormality is present or not in the flow control device.

2. The gas flow monitoring system according to claim 1, wherein
   the first flow monitoring unit includes a first start cutoff valve, a first measurement tank, a first pressure gauge, and a regulator that are arranged in this order from a side close to the gas supply source, and
   during the constant monitoring, the first start cutoff valve is sequentially opened and closed at predetermined time intervals, and a pressure lower limit of the gas supply pressure in the first measurement tank repeatedly rising and lowering is equal to or more than a set pressure of the regulator providing an upstream-side pressure of the flow control device.

3. The gas flow monitoring system according to claim 1, wherein
   the second flow monitoring unit includes a second start cutoff valve, a second measurement tank, a second pressure gauge, and an operation cutoff valve that are arranged in this order from a side close to the flow control device,
   the discharge passage is provided with a suction pump; and
   the second flow monitoring unit is configured to verify the flow rate by opening the operation cutoff valve so that the gas pressure in the second measurement tank is brought into a vacuum state by the suction pump, and then closing the operation cutoff valve and opening the second start cutoff valve, and measuring a pressure rising amount of the gas pressure in the second measurement tank.

4. The gas flow monitoring system according to claim 2, wherein
   the second flow monitoring unit includes a second start cutoff valve, a second measurement tank, a second pressure gauge, and an operation cutoff valve that are arranged in this order from a side close to the flow control device,
   the discharge passage is provided with a suction pump; and
   the second flow monitoring unit is configured to verify the flow rate by opening the operation cutoff valve so that the gas pressure in the second measurement tank is brought into a vacuum state by the suction pump, and then closing the operation cutoff valve and opening the second start cutoff valve, and measuring a pressure rising amount of the gas pressure in the second measurement tank.

5. The gas flow monitoring system according to claim 1, wherein the first flow monitoring unit is provided in a gas line using a coating material gas.

6. A gas flow monitoring system to be provided in a plurality of process gas lines each being arranged to supply gas from a process gas supply source to a predetermined process chamber via a flow control device, the system being configured to measure lowering or rising of gas pressure before and after the flow control device to monitor a flow rate of the flow control device, the system including:
   a first flow monitoring unit placed in a passage located upstream of the flow control device in an arbitrarily selected process gas line of the process gas lines;
   a second flow monitoring unit placed in a discharge passage branching from a passage located upstream of the process chamber; and
   a controller that constantly monitors a flow rate of the flow control device with the first flow monitoring unit and that, when the first flow monitoring unit verifies the flow rate by a predetermined number of times, commands the first and second flow monitoring units to simultaneously verify the flow rate and commands the first flow monitoring unit to correct, based on a flow-rate verification result of the second flow monitoring unit, a verification deviation amount defined by a difference between a flow rate calculated in the flow-rate verification performed by using the first flow monitoring unit and a flow rate set in the flow control device.

7. The gas flow monitoring system according to claim 6, wherein
   the first flow monitoring unit includes a plurality of first flow monitoring units, and
   the system is configured such that, when deviation amounts of flow rates in the flow-rate verification performed by simultaneous use of one of the first flow monitoring units and the second flow monitoring unit are determined to be equal to or more than a specific percentage, the flow-rate is re-verified by simultaneous use of another of the first flow monitoring units and the second flow monitoring unit.

8. The gas flow monitoring system according to claim 7, wherein
   when the deviation amounts of the flow rates verified by the another of the first flow monitoring units and the second flow monitoring unit in re-verification of the flow-rate are determined to be equal to or more than another specific percentage, it is determined that the second flow monitoring unit is suspended to be faulty, and,
   when the deviation amounts of the flow rates verified in the re-verification are determined to be less than the another specific percentage, it is determined that the one of the first flow monitoring units is faulty.

9. The gas flow monitoring system according to claim 6, wherein
   the first flow monitoring unit includes a first start cutoff valve, a first measurement tank, a first pressure gauge, and a regulator that are arranged in this order from a side close to the gas supply source, and
   during the constant monitoring, the first start cutoff valve is sequentially opened and closed at predetermined time intervals, and a pressure lower limit of the gas supply pressure in the first measurement tank repeatedly rising and lowering is equal to or more than a set pressure of the regulator providing an upstream-side pressure of the flow control device.

10. The gas flow monitoring system according to claim 6, wherein
    the second flow monitoring unit includes a second start cutoff valve, a second measurement tank, a second pressure gauge, and an operation cutoff valve that are arranged in this order from a side close to the flow control device,
    the discharge passage is provided with a suction pump; and
    the second flow monitoring unit is configured to verify the flow rate by opening the operation cutoff valve so that the gas pressure in the second measurement tank is brought into a vacuum state by the suction pump, and then closing the operation cutoff valve and opening the second start cutoff valve, and measuring a pressure rising amount of the gas pressure in the second measurement tank.

11. The gas flow monitoring system according to claim 9, wherein
    the second flow monitoring unit includes a second start cutoff valve, a second measurement tank, a second pressure gauge, and an operation cutoff valve that are arranged in this order from a side close to the flow control device,
    the discharge passage is provided with a suction pump; and
    the second flow monitoring unit is configured to verify the flow rate by opening the operation cutoff valve so that the gas pressure in the second measurement tank is brought into a vacuum state by the suction pump, and then closing the operation cutoff valve and opening the second start cutoff valve, and measuring a pressure rising amount of the gas pressure in the second measurement tank.

12. The gas flow monitoring system according to claim 6, wherein the first flow monitoring unit is provided in a gas line using a coating material gas.

* * * * *